S. WILLIAMSON.
METAL TURNING LATHE.
No. 172,679. Patented Jan. 25, 1876.
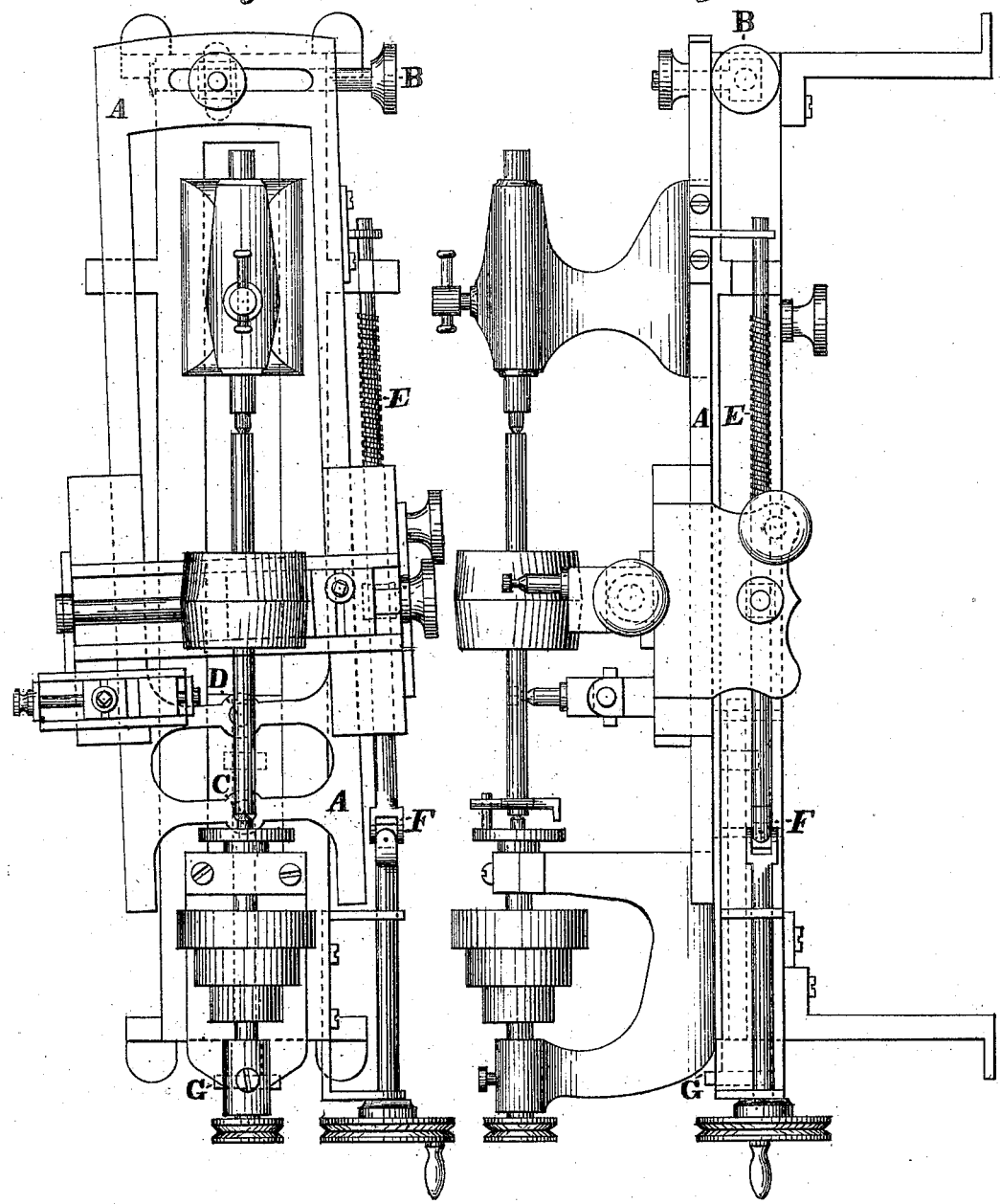
Witnesses:
Inventor.
Samuel Williamson

UNITED STATES PATENT OFFICE.

SAMUEL WILLIAMSON, OF CINCINNATI, OHIO.

IMPROVEMENT IN METAL-TURNING LATHES.

Specification forming part of Letters Patent No. 172,679, dated January 25, 1876; application filed June 15, 1875.

*To all whom it may concern:*

Be it known that I, SAMUEL WILLIAMSON, of Cincinnati, in the county of Hamilton and State of Ohio, have invented a new and useful Improvement in Lathes, which improvement is fully set forth in the following specifications, reference being had to the accompanying drawings.

The invention relates to that class of devices known as bevel or taper lathes; and the improvement consists, principally, in a separate movable bed-piece or ways for the slide-rest, and the appliances for adjusting and using the same, the object being to secure a quick, simple, and accurate means of adjusting lathes for turning any taper or bevel.

Figure 1 is a plane view, in which it was thought advisable to show a simple manner of using the lathe in turning double tapers or bevels. Fig. 2 is a front elevation of the same.

A is a separate movable bed-piece or ways for the slide-rests, furnished with a screw, B, by which it may be moved as a radius on the fulcrum C or D.

The screw E is attached to the shears A, and furnished with a universal joint, F, to enable it to maintain a position parallel to the edge of the shear A, for the purpose of moving the carriage on the same.

The screw G is used to adjust the plate which carries the fulcrum C or D, either of which may be used.

The operation is as follows: Having with the screw B adjusted the bed-piece A to the required bevel, the lathe being put in motion, the carriage is made to travel, by the screw E, longitudinally on the bed-piece A.

In case a quicker taper is required than may be obtained by this means, set the bed-piece A to an angle, with the line through the center of the lathe equal to the angle at the base of the cone or frustum of a cone to be turned, and move the tool at a right angle with the bed-piece A.

This invention may also be used in turning concave or convex bodies by moving the bed-piece A on a center placed so that the cutting-edge of the tool will move on the periphery of the circle of the concave or convex to be turned.

I claim as my invention—

1. The combination, substantially as herein shown and described, of the slide-rest, bed-piece A, and a turning-lathe.

2. The combination, substantially as herein shown and described, of the bed-piece A, the slide-rest, and the feed-screw E, provided with the universal joint F.

3. The combination, substantially as herein shown and described, of the bed-piece A and its fulcrum, the screw B, the slide-rest, and the feed-screw E, provided with the universal joint F.

SAMUEL WILLIAMSON.

Witnesses:
 W. E. BASSETT,
 GEO. H. HIGH.